July 28, 1936.  G. L. ROSEBROOK  2,049,025
SERVICING AUTOMOTIVE VEHICLES
Filed Dec. 28, 1933  2 Sheets-Sheet 1
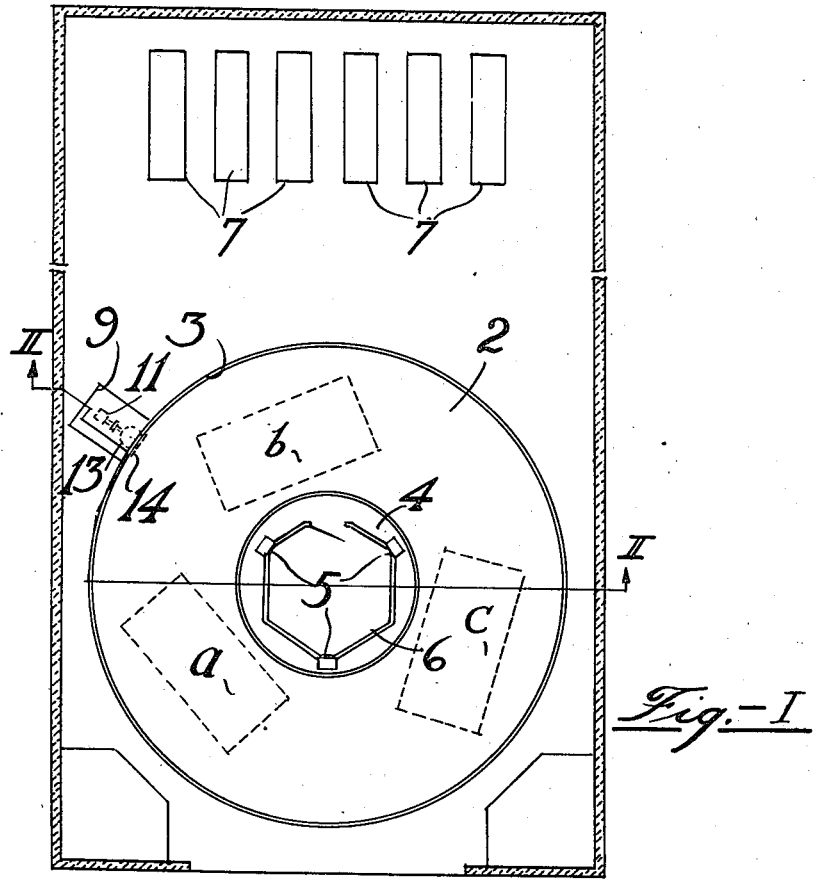
Fig.-I
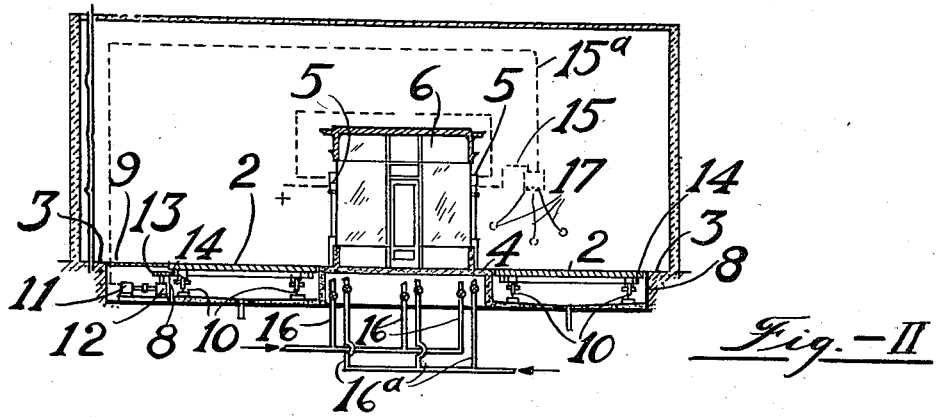
Fig.-II
Guy L Rosebrook Inventor
W. E. Currie Attorney July 28, 1936.  G. L. ROSEBROOK  2,049,025
SERVICING AUTOMOTIVE VEHICLES
Filed Dec. 28, 1933  2 Sheets-Sheet 2
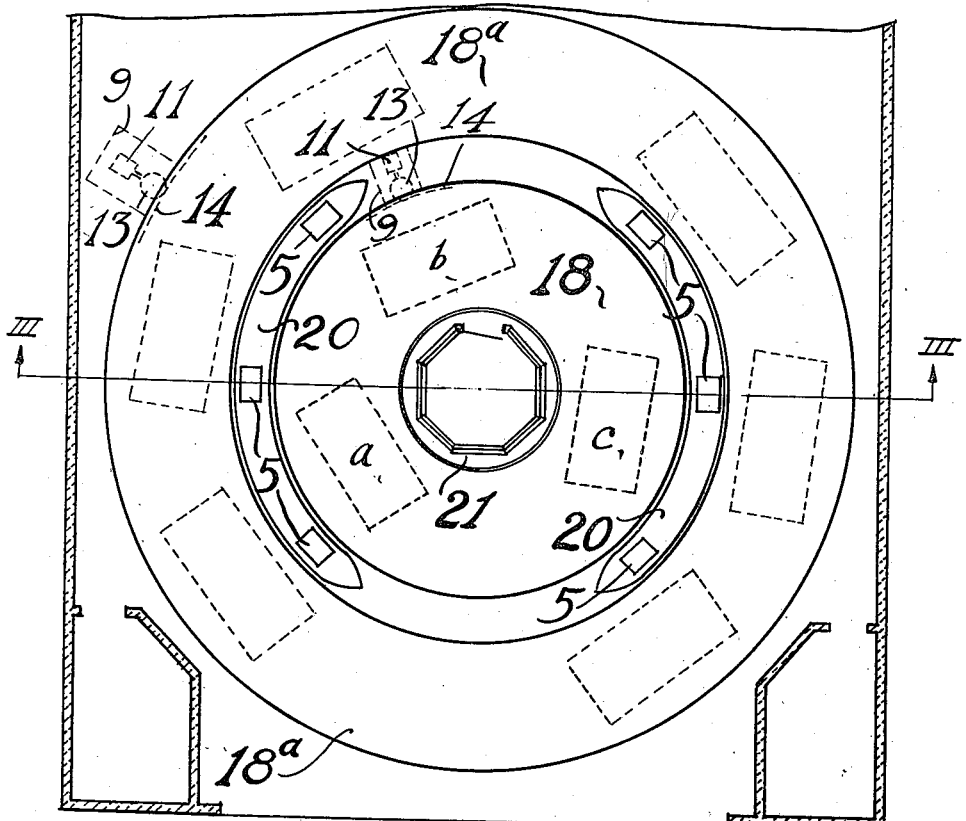
Fig.-IV.
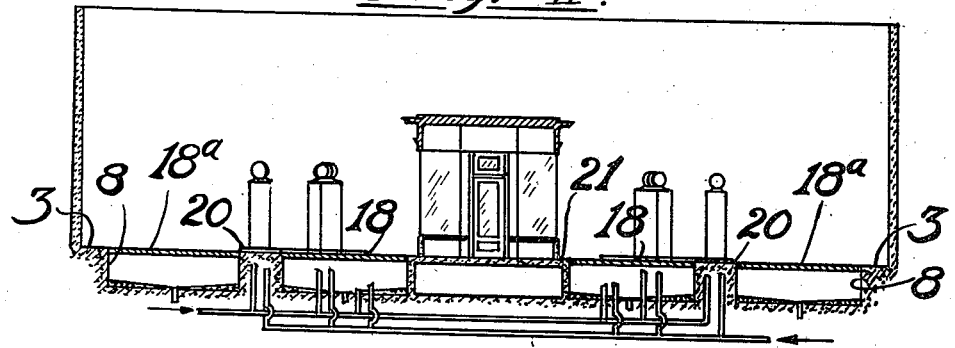
Fig.-V.
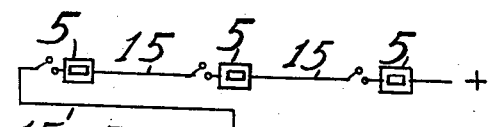
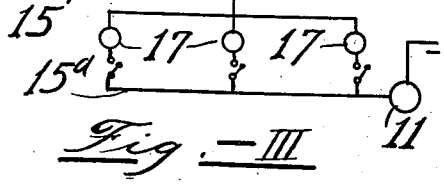
Fig.-III.
Guy L Rosebrook Inventor
W. E. Currie Attorney.

Patented July 28, 1936

2,049,025

UNITED STATES PATENT OFFICE 2,049,025

SERVICING AUTOMOTIVE VEHICLES

Guy L. Rosebrook, South Orange, N. J., assignor to Standard Oil Development Company, a corporation of Delaware Application December 28, 1933, Serial No. 704,254

3 Claims. (Cl. 221—99)

The present invention relates to a method and means for adapting narrow areas for use in servicing automotive vehicles, especially automobiles of the passenger car type.

The conventional service station for such vehicles requires the use of an area sufficiently large to permit entrance and exit to be made without danger to pedestrians or disruption of street traffic. This, unless a corner plot is available, requires that such an area be wide enough to permit the larger vehicles of the type usually serviced to make a complete turn within the limits of the service area. When it is considered that an automobile having a wheel base as short as 112 inches cannot make a complete turn in less than 25 feet under most favorable conditions it is apparent that a plot at least 60 feet wide is required to accommodate servicing equipment and provide the minimum turning area for larger vehicles.

In large cities, substantial areas of property suitable for such purposes as contemplated, are not readily available and even when it is possible to secure such areas the purchase price or rental is, ordinarily, excessive.

According to the present invention smaller plots may be employed without the necessity of using corner locations; and developed property may also be readily adapted for use. In any case, without inconvenience to customers, the capacity of any area can be greatly increased.

In order more clearly to describe the present invention, reference is made to the accompanying drawings in which Figure I is a plan view of a single unit installation in a building having an overall width of 40 feet.

Figure II is a cross sectional view through the line II—II in Figure I.

Figure III is a diagrammatic illustration of the control system for the operation of the vehicle platform.

Figure IV is a plan view of a multiple unit installation.

Figure V is a cross sectional view through the line III—III of Figure IV.

Referring to Fig. I, numeral 1 designates the walls of the building within which the service area is contained or the boundary of such area. Numeral 2 designates a rotatable vehicle platform or turntable, preferably annular in form and having an outside diameter approximately equal to the width of the building or the lot on which it is placed. The turntable is supported conventionally on tracks set in a circular pit in such a manner that the surface of the turntable is level with the floor of the building or the level of the ground, designated by numeral 3, and so that there is no more clearance between the outer edge of the turntable and the inner edge of the pit than may be necessary to permit the turntable to revolve freely therein.

Numeral 4 designates a circular stationary service platform which may rest on a substantially solid base in the circular pit, protruding through the central opening of the turntable 2, or may be supported upon steel or concrete pillars and similarly disposed. Numeral 5 designates servicing equipment such as gasoline pumps and the like mounted on platform 4.

The gasoline pumps and other servicing equipment are connected to the required reservoirs, etc. conveniently located beneath the turntable or the floor of the building, or otherwise, by means of pipes as illustrated in Figure II.

According to applicant's invention the gasoline pumps and other equipment are electrically connected through automatic switches in series relationship, with the electrical switches controlling the operation of the means employed to rotate the turntable. These control switches are diagrammatically illustrated in Fig. III and their operation will be easily understood.

The turntable 2 in the preferred embodiment of the invention, is rotated in either direction by an electric motor controlled by switches on the service platform 4. These switches are arranged in a parallel circuit so that any one will start, stop or reverse the motor. However, for safety it is necessary that the turntable remain stationary during the servicing operations and therefore all equipment involving a connection with the vehicle, such as gasoline pumps, air hose and the like is provided with self opening switches which are connected in series circuit with each other and also with the circuit of parallel connected switches previously mentioned.

Numeral 6 designates an enclosed space on the service platform 4 suitable for use as an office and for display of products if glass-enclosed.

Numeral 7 designates a series of lubricating pits installed at the rear of the area which may be reached via the turntable 2.

In operation, a vehicle entering the building is driven upon the turntable. Due to a calculated relationship between the width of the turntable and the width of the standard automobile tread, the driver of the vehicle will naturally tend to place it in the proper position relative to the service platform without the necessity of substantial maneuvering. To accomplish this result, the turntable should not be substantially greater than 120 inches nor substantially less than 112 inches wide, from inner edge to outer edge, no matter what the diameter of the circle formed by the outer edge may be.

The vehicle in its initial position may be specified as being in position $a$ as illustrated by dotted lines on the turntable in Fig. I. In order to accommodate a second vehicle the turntable is rotated through approximately 120° of a circle and the vehicle is then in position b. Such servicing as required may now be performed.

Assuming now that a second vehicle has entered the building and placed itself correspondingly in position a, such servicing equipment as may be in use on the first vehicle is returned to its proper place on the service platform and the turntable rotated so as to bring the second vehicle into position b and the first vehicle into position c, leaving position a vacant for possible occupation by a third vehicle.

When the first vehicle has been completely serviced, having moved through approximately 240° of a circle, it is in position to leave the building fore end foremost.

It is to be understood that although the foregoing description has anticipated the entrance of all vehicles from the right side of the building, it is possible either completely to reverse the procedure or by proper manipulation of the controls to accommodate vehicles entering from both the right and the left sides in succession. Furthermore, vehicles may be passed to and from the pits 7 via the turntable 2.

Referring to Fig. II, numeral 8 designates the wall of a circular pit, having an opening to an alcove 9 located at some convenient point on its periphery to accommodate the means for rotating the turntable 2. As in Fig. I, numeral 3 designates the surrounding ground or floor; numeral 4 the service platform; numeral 5 the service equipment on platform 4; and numeral 6 designates the enclosure on platform 4.

As illustrated, the turntable is supported by wheels on tracks 10 and is moved in either direction on these tracks by the motor 11 through a reduction gear box 12, pinion gear 13 and a ring gear 14 attached to the outer edge of the framework supporting the turntable 2. The numerals 15 and 15a designate the electrical circuits and their connections mentioned above, while numerals 16 and 16a designate the means of supply to the servicing equipment from the reservoirs, not shown. Numeral 17 designates the control switches.

In Fig. III the electrical connections are diagrammatically illustrated. As in Figs. I and II, numeral 5 designates the service equipment, numeral 17 designates the control switches, and numerals 15 and 15a designate the connections and switches between the service equipment units and the control units respectively, as well as the connection to the motor 11. The flow of current in this system is apparent, and the method of operation has been described above.

Although the present invention has for its primary purpose the adaptation of narrow areas for use as service stations for automobiles, it has been found that the principles thereof may be applied as well to areas having large frontages, which ordinarily might be used without special treatment. It has been found that the use of this invention in such areas not only increases the capacity thereof, but assists materially in improving the standard and speed of service.

Such adaptation is illustrated in plan view by Fig. IV and consists in utilizing two concentric, separately rotatable turntables 18 and 18a separated by an interrelated stationary, annular spacing element 19 having quarter sections 20 thereof raised above the level of the turntable to form service platforms, in addition to a circular concentric stationary platform 21 protruding from the centrally located circular opening in the inner turntable 18.

The raised sections 20 are shown as containing the servicing equipment in this adaptation, but the center platform 21 may also be equipped as previously described.

A cross sectional view of this type of installation taken on line III—III of Fig. IV is shown in Fig. V.

In this adaptation the turntables are operated individually in substantially the same manner as the single unit described in connection with Fig. I, the same basic principles being carried out.

Numerous forms of turntables for vehicles adapted to run on tracks have heretofore been patented. Also turntables for washing automotive vehicles have been proposed. The present invention, as distinguished from these, provides a novel and useful combination of a turntable with means adapted to supply gasoline, air, water or other materials to the vehicle, provision being made for safe and convenient servicing.

The present invention is not to be limited by the particular details disclosed for the purpose of a better understanding thereof, but only by the following claims in which it is my intention to claim all novelty inherent in the invention as broadly as the prior art permits.

I claim:

1. A station for servicing automotive vehicles, consisting of a service area, an annular rotatable vehicle platform, a concentric stationary service platform, means for intermittently rotating said vehicle platform actuated by controls located on said service platform, servicing equipment associated in fixed relationship with said service platform and operatively connected in series relationship with said controls between a source of energy and the means for rotating said vehicle platform, in order to deenergize said means when any portion of the servicing equipment is in use and cause said vehicle platform to be held in fixed relationship to the service platform.

2. Apparatus for servicing automotive vehicles, consisting of two or more concentric, independently rotatable annular turntables to support and position said vehicles in predetermined servicing relationship to one or more service platforms, comprising portions of a stationary, annular, spacing element between the annular turntables and protruding slightly above the level thereof, means for independently and intermittently rotating said turntables actuated by controls on said service platforms, servicing equipment associated in fixed relationship with said service platforms and operatively connected in series relationship with said controls between the source of energy and the means for rotating said annular turntables, whereby the use of any portion of the servicing equipment deenergizes said rotating means, and causes said turntables to be held in fixed relationship to the service platforms.

3. An automobile servicing station comprising a stationary platform, non-rotatable servicing means thereon, a rotary platform adapted to position automobiles placed thereon, in predetermined servicing relationship to the stationary platform, and electrical means operative to rotate the platform only when the servicing means are not in use.

GUY L. ROSEBROOK.